United States Patent [19]
Sakabe

[11] Patent Number: 4,485,181
[45] Date of Patent: Nov. 27, 1984

[54] DIELECTRIC CERAMIC COMPOSITION
[75] Inventor: Yukio Sakabe, Kyoto, Japan
[73] Assignee: Murata Manufacturing Co., Ltd., Kyoto, Japan
[21] Appl. No.: 504,972
[22] Filed: Jun. 16, 1983
[30] Foreign Application Priority Data
　　Jul. 8, 1982 [JP] Japan .............................. 57-119476
[51] Int. Cl.$^3$ ............................................ C04B 35/46
[52] U.S. Cl. .................................. 501/136; 361/321;
　　　　　　　　　　　　　　　　 501/135; 501/138; 501/139
[58] Field of Search ............... 501/136, 135, 138, 139;
　　　　　　　　　　　　　　　　　　　　　　　　361/321

[56] References Cited
U.S. PATENT DOCUMENTS

| 3,268,783 | 8/1966  | Saburi          | 501/139 |
| 3,410,705 | 11/1968 | Honma           | 361/321 |
| 3,869,398 | 3/1975  | Yamaoka et al.  | 501/136 |
| 3,951,873 | 4/1976  | Kikuchi et al.  | 501/137 |
| 4,226,735 | 10/1980 | Sakabe          | 361/321 |
| 4,379,854 | 4/1983  | Soong           | 501/138 |
| 4,388,416 | 6/1983  | Sakabe          | 501/136 |

FOREIGN PATENT DOCUMENTS

| 51-70500 | 6/1976 | Japan          | 501/136 |
| 1029539  | 5/1966 | United Kingdom | 501/136 |
| 262201   | 1/1970 | U.S.S.R.       | 501/136 |

Primary Examiner—Helen M. McCarthy
Attorney, Agent, or Firm—Finnegan, Henderson, Farabow, Garrett & Dunner

[57] ABSTRACT

Dielectric ceramic composition containing by weight, 33% to 40% of $PbTiO_3$; 6% to 35% of $SrTiO_3$; 3% to 18% of $CaTiO_3$; 0.5% to 10% of $MgTiO_3$; 6% to 26% of $Bi_2O_3$; 3% to 15% of $TiO_2$; 0.2% to 4% of ZnO; 0.2% to 5% of $Nb_2O_5$; 0.1% to 4% of $CeO_2$ and 0.1% to 2% of $Al_2O_3$.

3 Claims, No Drawings

DIELECTRIC CERAMIC COMPOSITION

This invention relates to a dielectric ceramic composition having a high permittivity and a low dependency on d.c. voltage.

BACKGROUND OF THE INVENTION

Ceramic compositions having a permittivity of 1000 or more have been prepared in the past from barium titanate, $BaTiO_3$, and modified $BaTiO_3$. Ceramics of these materials, however, experience a permittivity change of as much as $-20\%$ to $-50\%$ when a high direct-current voltage of 2 to 4 KV per mm of thickness is applied to them, because of the large dependency of the material on voltage.

Ceramic compositions containing $SrTiO_3$-$PbTiO_3$-$Bi_2O_3$-$TiO_2$ as basic constituents also have been used in recent years. This type of ceramic composition is the so-called relaxation type of ferroelectric material, which has a permittivity of 500 to 2000 at room temperature but a lower dependency on voltage than that of $BaTiO_3$ type compositions. In these compositions, however, containing a large amount of PbO and $Bi_2O_3$, which are easily evaporated during sintering, it is difficult to obtain uniform ceramic materials if the burning atmosphere of lead or bismuth is not controlled. This is because the sintering temperature used to obtain optimum dielectric characteristics is as high as 1200° C. to 1320° C.

SUMMARY OF THE INVENTION

Accordingly, an object of the present invention is to provide a dielectric ceramic composition having a high permittivity constant of 1000 or more with a low dependency on direct-current voltage.

A further object of the present invention is to provide a dielectric ceramic composition capable of being sintered at a low temperature.

The objects of the present invention can be obtained by providing a dielectric ceramic composition comprising $PbTiO_3$, $SrTiO_3$, $CaTiO_3$, $MgTiO_3$, $TiO_2$, $Bi_2O_3$, ZnO, $Nb_2O_5$, $CeO_2$ and $Al_2O_3$ wherein each constituent is present in the following amounts by weight:

| | |
|---|---|
| $PbTiO_3$ | 33% to 40% |
| $SrTiO_3$ | 6% to 35% |
| $CaTiO_3$ | 3% to 18% |
| $MgTiO_3$ | 0.5% to 10% |
| $Bi_2O_3$ | 6% to 26% |
| $TiO_2$ | 3% to 15% |
| ZnO | 0.2% to 4% |
| $Nb_2O_5$ | 0.2% to 5% |
| $CeO_2$ | 0.1% to 4% |
| $Al_2O_3$ | 0.1% TO 2% |

DETAILED DESCRIPTION OF THE INVENTION

It is to be understood that the foregoing general description and the following detailed description are exemplary and explanatory but are not restrictive of the invention.

The ceramic compositions of this invention were prepared as follows. First equimolar amounts of PbO and $TiO_2$, $SrCO_3$ and $TiO_2$, $CaCO_3$ and $TiO_2$, and $MgCO_3$ and $TiO_2$, each having a purity of 99% or more, were blended together and calcined at a temperature of 1000° C. to 1150° C. to synthesize, respectively, lead titanate, $PbTiO_3$; strontium titanate, $SrTiO_3$; calcium titanate, $CaTiO_3$; and magnesium titanate, $MgTiO_3$. These titanates were then weighed together with $Bi_2O_3$, $TiO_2$, ZnO, $Nb_2O_5$, $Al_2O_3$ and $CeO_2$, each also having a purity of 99% or better, to obtain the compositions shown in Table 1.

TABLE 1

| Example No. | $PbTiO_3$ | $SrTiO_3$ | $CaTiO_3$ | $MgTiO_3$ | $Bi_2O_3$ | $TiO_2$ | ZnO | $Nb_2O_5$ | $Al_2O_3$ | $CeO_2$ |
|---|---|---|---|---|---|---|---|---|---|---|
| 1 | 36.5 | 33.3 | 5.0 | 2.5 | 15.0 | 7.1 | 0.2 | 0.2 | 0.1 | 0.1 |
| 2 | 37.5 | 34.8 | 7.0 | 5.5 | 10.0 | 3.0 | 1.0 | 0.5 | 0.5 | 0.2 |
| 3 | 36.0 | 30.0 | 3.0 | 7.0 | 10.0 | 6.5 | 4.0 | 2.0 | 1.0 | 0.5 |
| 4 | 33.0 | 8.5 | 8.4 | 4.0 | 21.0 | 13.6 | 4.0 | 5.0 | 2.0 | 0.5 |
| 5 | 33.0 | 7.0 | 8.5 | 1.0 | 25.5 | 15.0 | 2.0 | 5.0 | 1.0 | 2.0 |
| 6 | 40.0 | 17.8 | 10.8 | 0.5 | 15.3 | 10.2 | 0.2 | 1.0 | 0.2 | 4.0 |
| 7 | 40.0 | 26.6 | 15.0 | 2.0 | 10.5 | 4.0 | 0.2 | 0.5 | 0.2 | 1.0 |
| 8 | 38.0 | 33.0 | 15.0 | 1.0 | 8.5 | 3.2 | 0.2 | 0.5 | 0.1 | 0.5 |
| 9 | 33.0 | 24.9 | 18.0 | 0.5 | 12.0 | 5.1 | 2.0 | 3.5 | 0.5 | 0.5 |
| 10 | 40.0 | 35.0 | 3.0 | 7.0 | 10.0 | 3.6 | 0.2 | 0.5 | 0.2 | 0.5 |
| 11 | 40.0 | 35.0 | 5.3 | 0.5 | 6.0 | 3.2 | 4.0 | 4.0 | 1.0 | 1.0 |
| 12 | 34.0 | 32.0 | 15.0 | 4.0 | 10.0 | 5.0 | 0 | 0 | 0 | 0 |
| 13 | 35.8 | 29.8 | 15.0 | 4.0 | 10.0 | 5.0 | 0.2 | 0.2 | 0 | 0 |
| 14 | 35.8 | 29.9 | 15.0 | 4.0 | 10.0 | 5.0 | 0 | 0 | 0.1 | 0.2 |
| 15 | 34.0 | 22.0 | 15.0 | 4.0 | 10.0 | 5.0 | 1.0 | 2.5 | 0.5 | 6.0 |
| 16 | 34.0 | 22.0 | 10.0 | 7.0 | 10.0 | 5.0 | 4.0 | 5.0 | 2.5 | 0.5 |
| 17 | 33.0 | 22.5 | 10.0 | 7.0 | 10.0 | 5.0 | 1.0 | 7.0 | 0.5 | 4.0 |
| 18 | 33.0 | 22.0 | 10.0 | 7.0 | 10.0 | 5.0 | 5.5 | 5.0 | 2.0 | 0.5 |
| 19 | 40.0 | 10.9 | 10.0 | 3.6 | 15.3 | 18.0 | 1.0 | 0.5 | 0.5 | 0.2 |
| 20 | 33.0 | 6.2 | 10.0 | 3.6 | 30.0 | 15.0 | 1.0 | 0.5 | 0.5 | 0.2 |
| 21 | 36.5 | 24.9 | 10.0 | 12.0 | 10.5 | 4.0 | 1.0 | 0.4 | 0.5 | 0.2 |
| 22 | 33.0 | 26.8 | 20.0 | 1.0 | 12.0 | 5.1 | 1.0 | 0.4 | 0.5 | 0.2 |
| 23 | 25.0 | 40.0 | 15.0 | 3.6 | 10.0 | 5.0 | 0.2 | 0.2 | 0.5 | 0.5 |
| 24 | 45.0 | 25.0 | 10.0 | 3.6 | 10.0 | 5.0 | 0.2 | 0.2 | 0.5 | 0.5 |
| 25 | 30.0 | 31.0 | 15.0 | 5.5 | 10.0 | 4.0 | 1.0 | 2.5 | 0.5 | 0.5 |
| 26 | 40.0 | 5.0 | 18.0 | 5.5 | 15.3 | 10.2 | 1.0 | 2.5 | 1.0 | 1.5 |
| 27 | 38.0 | 35.5 | 1.0 | 4.0 | 12.0 | 5.0 | 1.0 | 2.5 | 0.5 | 0.5 |
| 28 | 40.0 | 35.3 | 5.3 | 0.2 | 6.0 | 3.2 | 4.0 | 4.0 | 1.0 | 1.0 |
| 29 | 38.5 | 35.0 | 7.0 | 4.0 | 4.0 | 1.5 | 4.0 | 4.0 | 1.0 | 1.0 |

The materials of each of the Examples were put in a polyethylene pot mill together with 3% by weight of a vinyl acetate type binder, and were subjected to wet-mixing and powdering for 12 hours by means of alumina balls. Thereafter, the mixture was dried by evaporation and allowed to pass through a 85 mesh screen to adjust the particle size. The mixture was molded by an oil press under a pressure of 1000 Kg/cm² to obtain a disk having a diameter of 17 mm and a thickness of 1.2 mm.

The resulting disks were put in a zirconia case and sintered at a temperature of 1000° C. to 1320° C. for 2 hours. A silver paste was applied to both sides of the sintered material and burned at 800° C. to form electrodes.

Permittivity ($\epsilon$) and dielectric loss tangent (tan $\delta$) of the resulting disks were measured with a frequency of 1 KHz. Further, the change in permittivity (bias characteristic) as a result of applying a direct-current voltage of 4 KV/mm to the samples was measured. The results of the tests are shown in Table 2 below.

TABLE 2

| Example No. | Sintering Temperature (°C.) | Permittivity($\epsilon$) | Tan$\delta$ (%) | Bias Characteristic (%) |
|---|---|---|---|---|
| 1 | 1160 | 2680 | 0.8 | −15.1 |
| 2 | 1140 | 2210 | 0.6 | −12.5 |
| 3 | 1100 | 1720 | 0.3 | −4.5 |
| 4 | 1080 | 1180 | 0.9 | −0.5 |
| 5 | 1050 | 1010 | 0.8 | +2.3 |
| 6 | 1080 | 1480 | 0.4 | −6.5 |
| 7 | 1140 | 2980 | 0.4 | −7.0 |
| 8 | 1140 | 2650 | 0.6 | −10.5 |
| 9 | 1120 | 2100 | 0.2 | −5.0 |
| 10 | 1160 | 2440 | 0.3 | −1.0 |
| 11 | 1050 | 1320 | 0.2 | −12.8 |
| 12 | 1300 | 1860 | 2.0 | +2.8 |
| 13 | 1240 | 2100 | 2.3 | −5.6 |
| 14 | 1270 | 2400 | 1.1 | −7.0 |
| 15 | 1120 | 910 | 0.7 | −4.2 |
| 16 | 1080 | 870 | 0.8 | −3.2 |
| 17 | 1100 | 640 | 0.2 | −0.5 |
| 18 | 1080 | 610 | 0.3 | −3.8 |
| 19 | 1120 | 1850 | 1.6 | −55.0 |
| 20 | 1120 | 1440 | 4.5 | −32.0 |
| 21 | 1250 | 920 | 0.8 | −11.0 |
| 22 | 1270 | 1720 | 0.8 | −2.0 |
| 23 | 1250 | 690 | 0.4 | −0.5 |
| 24 | 1180 | 2700 | 4.0 | −35.0 |
| 25 | 1300 | 980 | 0.3 | −1.0 |
| 26 | 1100 | 2450 | 3.2 | −27.0 |
| 27 | 1120 | 2700 | 4.5 | −45.0 |
| 28 | 1050 | 860 | 0.2 | −10.5 |
| 29 | 1100 | 770 | 0.2 | −5.0 |

Example Nos. 1 to 11 in the Tables demonstrate the present invention while Example Nos. 12 to 29 are for comparative purposes.

In Table 2, the sintering temperature was the temperature at which the highest permittivity could be obtained. Ceramics sufficiently sintered cannot be obtained at a temperature lower than the sintering temperature. Further, if sintering is carried out at a temperature higher than the sintering temperature, the permittivity declines with the increase in temperature and a fusion reaction occurs between the disks or between the disk and its case.

As is obvious from Tables 1 and 2, the dielectric compositions of Examples 1-11 prepared according to the present invention, have high permittivity values of 1000 or more with excellent dielectric loss values of 1% or less, not withstanding the fact that the sintering temperature was 1050° C., which is 100° C. to 200° C. lower than used previously. Further, the change in permittivity as a result of additionally applying a direct-current voltage of 4 KV/mm to the disks was less than −20%.

On the other hand, and with reference to Examples 12-29, when the amount of PbTiO₃ is lower than 33% by weight, the permittivity is less than 1000. If it is more than 40% by weight, the tan $\delta$ exceeds 1% and the bias characteristic becomes inferior. Similarly, if the amount of SrTiO₃ is less than 6% by weight, the tan $\delta$ exceeds 1% and the bias characteristic exceeds −20%. If it is more than 35% by weight, the permittivity is less than 1000.

If the amount of CaTiO₃ is less than 3% by weight, the tan $\delta$ exceeds 1% and the bias characteristic exceeds −20% and if it is more than 18% by weight, sintering is insufficient. If the amount of MgTiO₃ is less than 0.5% by weight, the permittivity is less than 1000 and if it is more than 10% by weight, the sintering temperature becomes too high and the permittivity is reduced.

If $Bi_2O_3$ is less than 6% by weight, the permittivity is less than 1000 and if it is more than 26% by weight, the tan $\delta$ exceeds 1% and the bias characteristic deteriorates. When the amount of $TiO_2$ is less than 3% by weight, the permittivity is less than 1000 and if it is more than 15% by weight, the tan $\delta$ also exceeds 1% and the bias characteristic deteriorates.

When ZnO is less than 0.2% by weight; $Nb_2O_5$ is less than 0.2% by weight; $CeO_2$ is less than 0.1% by weight; or $Al_2O_3$ is less than 0.1% by weight, the sintering temperature in each case is too high and the tan $\delta$ exceeds 1%. Similarly if the amounts, be weight, of ZnO are greater than 4%; of $Nb_2O_5$ are greater than 5%; of $CeO_2$ are more than 4%; or of $A_2O_3$ are more than 2%, the permittivity in each case is less than 1000.

As is obvious from the above, a dielectric ceramic composition, according to the present invention, has a permittivity of more than 1000, a tan $\delta$ of less than 1% and a bias characteristic of less than −20%. Further, there is the advantage that a uniform ceramic can be obtained without having to carry out strict control of the sintering atmosphere because a low sintering temperature can be used.

The invention in its broader aspects is not limited to the specific details shown and described and departure may be made for such details without departing from the scope of the invention or without sacrificing its achieved advantages.

What is claimed is:

1. A dielectric ceramic composition having a sintering temperature ranging from 1050° C. to 1160° C. comprising PbTiO₃, SrTiO₃, CaTiO₃, MgTiO₃, TiO₂, Bi₂O₃, ZnO, Nb₂O₅, CeO₂ and Al₂O₃, wherein each constituent is present in the following amounts by weight:

| | |
|---|---|
| PbTiO₃ | 33% to 40% |
| SrTiO₃ | 6% to 35% |
| CaTiO₃ | 3% to 18% |
| MgTiO₃ | 0.5% to 10% |
| Bi₂O₃ | 6% to 26% |
| TiO₂ | 3% to 15% |
| ZnO | 0.2% to 4% |
| Nb₂O₅ | 0.2% to 5% |
| CeO₂ | 0.1% to 4% |
| Al₂O₃ | 0.1% TO 2% |

2. A dielectric ceramic composition having a sintering temperature ranging from 1050° C. to 1160° C. consisting essentially of PbTiO₃, SrTiO₃, CaTiO₃, MgTiO₃, TiO₂, Bi₂O₃, ZnO, Nb₂O₅, CeO₂ and Al₂O₃, wherein each constituent is present in the following amounts by weight:

| | |
|---|---|
| PbTiO$_3$ | 33% to 40% |
| SrTiO$_3$ | 6% to 35% |
| CaTiO$_3$ | 3% to 18% |
| MgTiO$_3$ | 0.5% to 10% |
| Bi$_2$O$_3$ | 6% to 26% |
| TiO$_2$ | 3% to 15% |
| ZnO | 0.2% to 4% |
| Nb$_2$O$_5$ | 0.2% to 5% |
| CeO$_2$ | 0.1% to 4% |
| Al$_2$O$_3$ | 0.1% TO 2% |

3. The dielectric ceramic composition of claim 2 having a permittivity of at least 1000, a dielectric loss tangent of 1% or less, and a bias characteristic as a result of applying a direct-current voltage of 4 KV/mm of less than −20%.

* * * * *